May 18, 1965   G. B. BOSCHEN   3,183,674
SUB-SURFACE IRRIGATION SYSTEM
Filed Nov. 14, 1961   3 Sheets-Sheet 1

George B. Boschen
INVENTOR.

BY *Clarence A. O'Brien*
and *Harvey B. Jacobson*
Attorneys

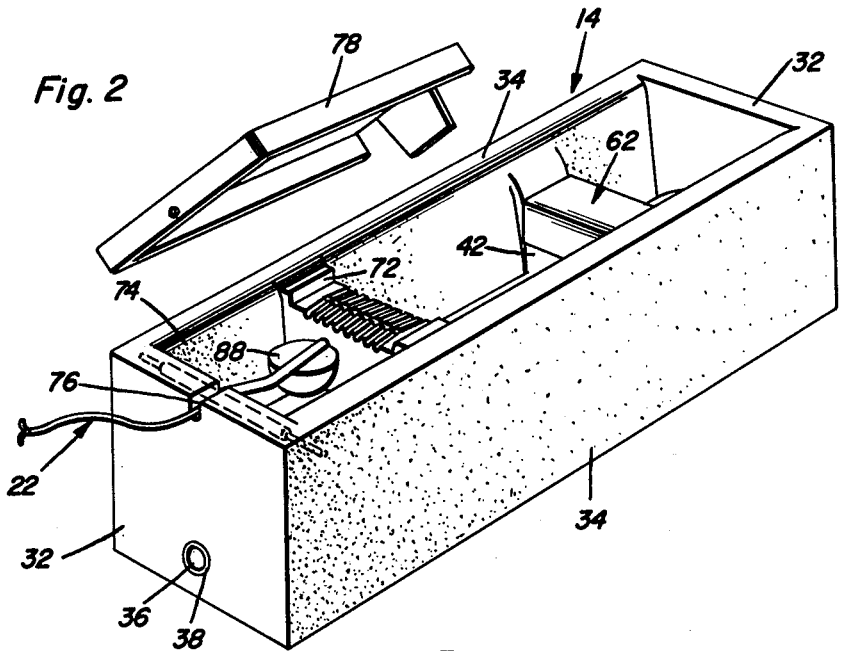
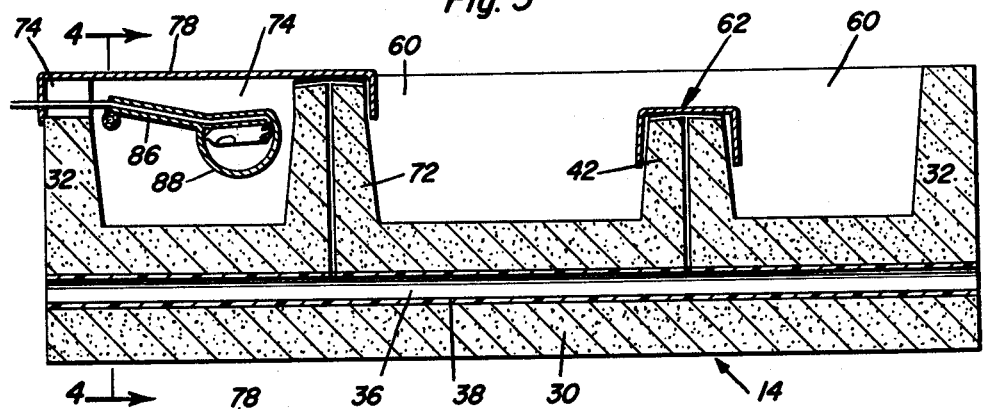
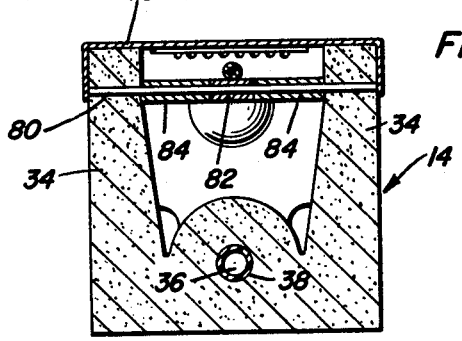
George B. Boschen
INVENTOR.

May 18, 1965 G. B. BOSCHEN 3,183,674
SUB-SURFACE IRRIGATION SYSTEM
Filed Nov. 14, 1961 3 Sheets-Sheet 3

George B. Boschen
INVENTOR.

United States Patent Office 3,183,674
Patented May 18, 1965

3,183,674
SUB-SURFACE IRRIGATION SYSTEM
George B. Boschen, 675 Mandaley Ave.,
Clearwater Beach, Fla.
Filed Nov. 14, 1961, Ser. No. 152,249
7 Claims. (Cl. 61—13)

This invention comprises a novel and useful sub-surface irrigating system and more particularly pertains to an irrigating device which will render a highly effective and economical distribution of irrigating water below the surface to the root system of vegetation to be irrigated thereby.

It is the primary object of this invention to provide a sub-surface irrigation system which shall be extremely economical and efficient in its use of water with a minimum loss of the irrigation water to soil underneath the system and thereby increasing the effectiveness of the irrigation system for beneficially utilizing all of the water supply for irrigating the root system of vegetation.

A further object of the invention is to provide a sub-surface irrigation system in accordance with the preceding object which will maintain a constant and uniform supply of water available for irrigation by a plurality of irrigating units disposed at uniform intervals along the irrigation system irrigating line, and which will attain this purpose regardless of a lack of uniformity in the depth or elevation of the various units of the system.

A still further object of the invention is to provide a sub-surface irrigation system in conformity with the above-mentioned objects which shall be capable of effectively operating and satisfactorily irrigating the root system of vegetation upon any reasonable amount of water pressure therein without the necessity for extremely high water pressures and regardless of whether the pressure supplied is fluctuating or uniform.

An additional object of the invention is to provide a sub-surface irrigation system in accordance with the preceding objects which will be equally adapted to effectively irrigate the root systems of vegetation regardless of whether the terrain is hilly or level.

Still another object of the invention is to provide a sub-surface irrigation system in compliance with the above set forth objects in which the water level in groups of one or more units of the sub-surface reservoirs of the system may be maintained at a desired value regardless of the elevation or depth of the system and wherein back-flow through the system which would result in draining of the system in the event of failure of the water supply will not interfere with continued operation of that portion of the system from its own supply of water retained therein.

Yet another purpose of the invention is to provide a sub-surface irrigation system in which a plurality of sub-surface reservoirs are so associated with each other in the system that the breakage of a reservoir and the loss of its irrigating functions will not interefere with continued operation of the rest of the system.

A still further important object of the invention is to provide an irrigation system in which sturdier reservoirs and containers are obtained through the use of a non-porous water impervious cement and thereby obtain less costly reservoir units.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of a sub-surface reservoir and control unit incorporated into the system of this invention and with the float chamber cover removed therefrom;

FIGURE 3 is a view in vertical longitudinal section through the unit of FIGURE 2;

FIGURE 4 is a vertical transverse sectional detail view taken substantially upon a plane indicated by the section line 4—4 of FIGURE 3 and showing certain details of the float control chamber of the unit;

Figure 8:
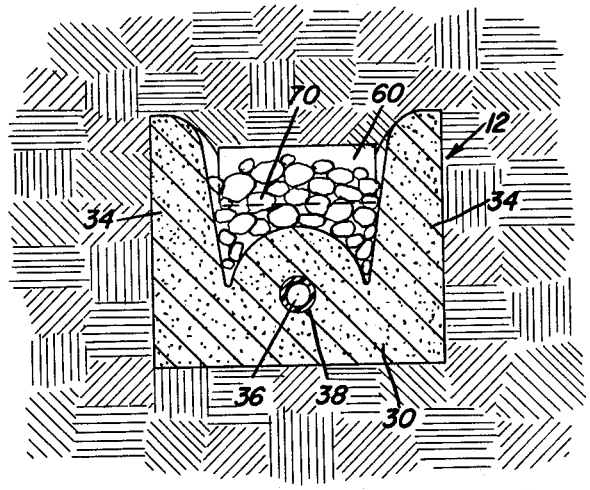
Figure 9:
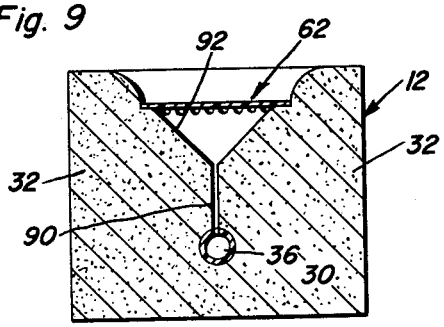
Figure 6:
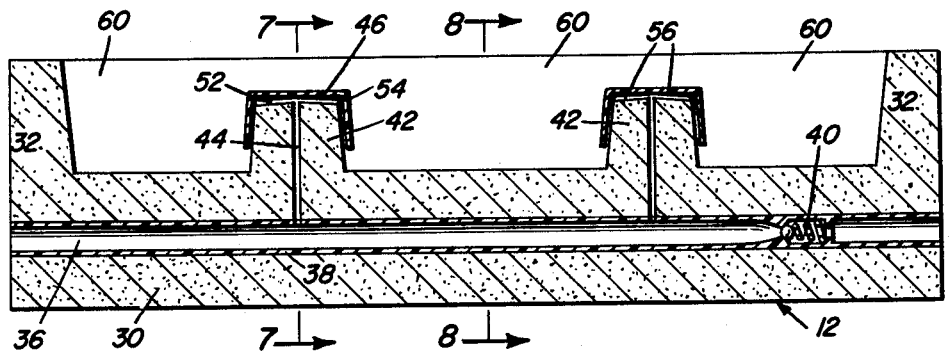
FIGURE 6 is a vertical longitudinal sectional view of the arrangement of FIGURE 5.
Figure 7:
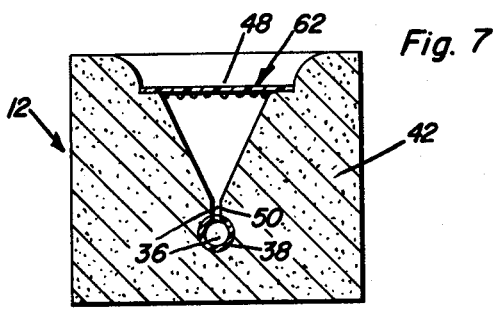

FIGURES 7 and 8 are vertical transverse sectional detail views taken substantially upon the planes indicated by the section lines 7—7 and 8—8 respectively of FIGURE 6; and FIGURE 9 is a view similar to FIGURE 7 but of a modified construction.

Figure 1:
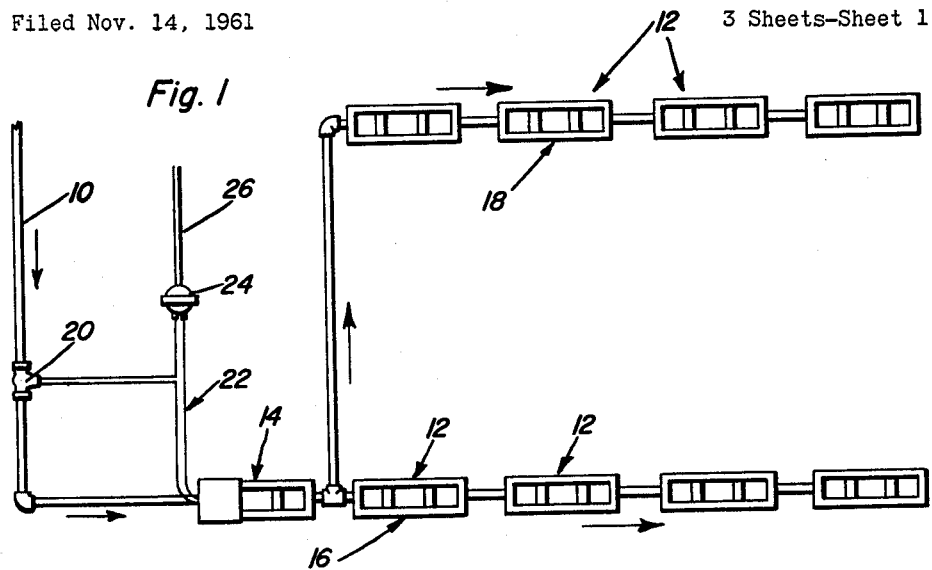
FIGURE 1 is a somewhat diagrammatic view in plan showing a typical sub-surface irrigation system in accordance with the principles of this invention.

Reference is made first to the somewhat diagrammatic view of FIGURE 1 for an explanation of a suitable sub-surface irrigation system in accordance with the present invention. Indicated by the numeral 10 is a water main supplying water from any suitable source, not shown, and in the direction indicated by the arrow to the series of sub-surface irrigating units by which the irrigating water is directly dispensed to the root vegetation system. These irrigating units are of two types consisting of simple irrigating units indicated generally by the numeral 12 together with a combined irrigating and control unit indicated by the numeral 14. As suggested in FIGURE 1, a series of these units may be disposed in one or more irrigation lines such as those indicated at 16 and 18 respectively, with a combined control and irrigating unit 14 being provided for each line 16 or for a group of lines 16 or 18.

An automatic control means is provided for such a system consisting of a suitable conventional type of solenoid operated control valve 20 disposed in the supply line 10 and which valve is controlled by suitable electric circuits such as those indicated generally at 22 and which derive their current as from a transformer 24 from any suitable electric source such as that indicated by the electric conduit 26. The means for controlling the water valve 20 by the electric system will be set forth in detail hereinafter.

Reference is made first to FIGURES 5-8 for a description of one of the simple irrigating units 12. Each of these units consists of a housing which is open at its top, has a bottom wall 30, end walls 32 together with side walls 34. As illustrated, the unit is of generally rectangular shape although it will be appreciated that other shapes may be also employed.

An important feature of this invention is that the unit 12, as also the unit 14 to be hereinafter described, is constructed of a water impervious material such as a waterproof cement in order to prevent any leakage or escape of the irrigating water therethrough which would thus result in the loss of water downwardly into the soil without benefit to the vegetation to be irrigated, this feature being in direct contrast to conventional practice in which sub-surface irrigating units are generally of a water pervious or porous nature. Not only does this construction result in utilization of the water supplied thereto to the best advantage, but also results in a much stronger construction and one less liable to breakage since the relatively denser water impervious cements have greater physical strength than do the porous or water permeable cements.

Each of the units 12 is provided with a water passage 36 extending longitudinally throughout the entire length of the bottom wall 30 thereof and which water passage is preferably formed by embedding a plastic tube 38 or a conduit of other suitable material, open at both ends, into the material from which the unit is formed.

As shown in FIGURE 6, there is preferably provided a check valve assembly indicated generally by the numeral 40 which is disposed in this passage at any suitable location therein and which valve unit may be of any conventional non-return check valve design. The purpose of this unit is to permit flow of water in a desired direction, as for example in the direction indicated by the arrows in FIGURE 1 from unit-to-unit along the irrigating line, but to prevent reverse flow therethrough. Preferably the units are so laid that if any unit should break or lose its water supply, the check valves would stop loss of the water from units on the up hill side beyond the injured unit.

A capillary means is provided for effecting a gradual dispensing of the water from each unit to the soil and the vegetation root system immediately thereabove. For this purpose, there are provided a plurality of transversely extending partitions 42 disposed in the hollow interior of each of the units 12 or 14 between the side walls 34 thereof, with the tops of these partitions lying at a level which is beneath the top edge of the ends and side walls 32 and 34. As shown in FIGURE 7 in conjunction with FIGURE 6, each of these partitions has one or more capillary slots 44 extending downwardly from the top surface 46 of the partitions into communication with the passage 36. The slot 44 is of a very narrow thickness, being of a capillary nature, but preferably is fan shaped as at 48 in order to have an outlet surface at the upper end of the partition which extends substantially across the length of the latter, while its lower or inlet end, as indicated at 50 in FIGURE 7 is of relatively small diameter where it communicates with the passage 36 within the tube 38.

Owing to the small thickness of this capillary slot, the rate of flow of water from the passage 36 is thus very limited and restricted in its nature thereby eliminating undue wastage of the irrigating water.

A further important feature of the invention is that the top surface 46 of the partition is provided with reversely sloping slightly inclined surfaces as at 52 and 54 which open from the slot 44 to opposite sides of the partition. These reversely inclined surfaces 52 and 54 are provided with a series of channels or grooves as at 56.

The spaces between adjacent partitions and between partitions and the end walls 32 thus define a plurality of wells or recesses in both of the units 12 and 14, each of which wells is indicated generally by the numeral 60 in FIGURES 3 and 6. Consequently, the liquid level will tend to be maintained in the series of wells as one overflows into the other.

Figure 5:
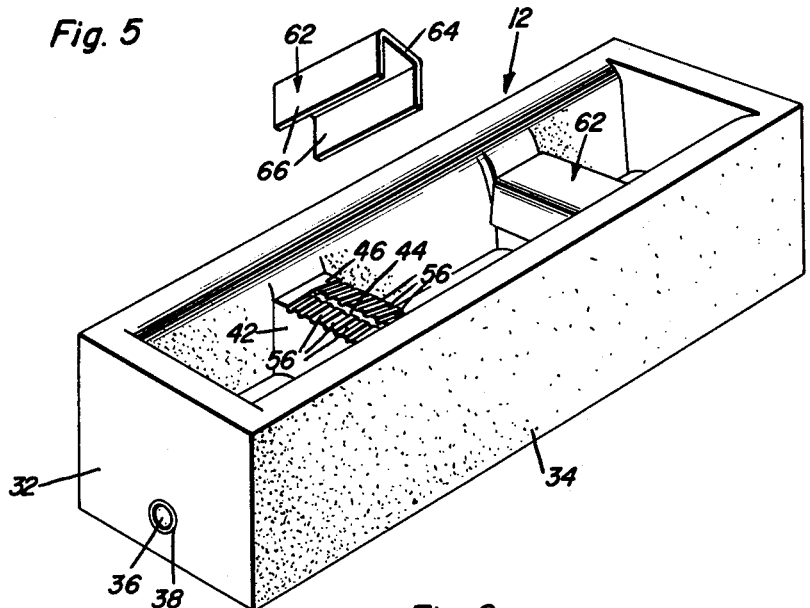
FIGURE 5 is a perspective view similar to FIGURE 2 but of a reservoir or chamber unit in which there is provided no control chamber therein.

In order to further restrict and limit flow from the capillary slot arrangement into the individual wells, there is provided a U-shaped cap or cover plate 62, see FIGURE 5 in particular, which consists of a flat plate 64 comprising a cover for the partitions, together with depending slightly outwardly and divergently inclined legs 66 which conform to the oppositely inclined vertical surfaces of the partitions themselves as shown in FIGURE 6. The cap has a loose fit upon the partitions so that there is provided a restricted space between the cap and partitions enabling flow of irrigation water upwardly through the capillary slot 44, through the channels 56, and then down the sides of the partition between the latter and the legs 66 into the chambers 60.

As shown in FIGURE 8, in actual operation it is preferred to provide a bed of gravel or the like as at 70 in the well 60 and with the device embedded in the soil, the soil itself will rest upon this gravel bed. Consequently, the irrigation water seeping into the wells from the capillary slot 44 will through the normal capillary action of the soil work upwardly into the root system of the vegetation thereabove. Thus, the most effective use is made of the supply of water with a resultant decrease in the loss of water downwardly into the soil.

As so far described, it will be apparent that any desired number of the units 12 may be assembled together into one or more of the irrigation lines 16 or 18 and may be operated as one or more units even without the control units 14 previously mentioned. However, it is considered that most effective results are obtained through utilization of a control unit 14 for each line 16 or for a group of lines such as those indicated at 16 and 18 in FIGURE 1.

The control unit, heretofore referred to as a combined control and irirgating unit 14 is disclosed in detail in FIGURES 2-4 and is generally similar in appearance and construction to the units 12. However, the hollow body or housing comprising the control unit 14 including the solid bottom wall construction 30, end walls 32 and side walls 34 as previously described also includes the passage means 36 with the tube 38 all as previously mentioned. In addition, there is provided one or more of the partitions 42 with their cover plates 62 and the constructions and connections exactly as previously described providing two or more of the wells or recesses 60 therein.

However, in the control unit 14 there is provided a further divider wall 72 which is of the same height as the end walls 32 and which provides with the adjacent end wall a level control chamber 74. The adjacent end wall 32 of this chamber has a notch or an opening therein as indicated at 76 through which the previously mentioned electric control conduit 22 extends. A removable cover 78 embraces the end wall 32 having the notch 76 therein, the divider 72 and the portion of the side wall 34 lying therebetween so as to prevent the ingress of soil into the chamber 74. However, in a similar manner to that of the partition cover 62, the cover 78 likewise covers the top surface of the divider 72 and permits restricted flow through the capillary passage system previously described. Inasmuch as the same capillary flow system through the dividers and into the various chambers and wells is employed as set forth in connection with the unit 12, a further description of the same is deemed to be unnecessary.

Further, in this form of the invention, the check valve unit 40 which was incorporated in one or more of the irrigating units 12 is omitted.

Mounted in the chamber 74 is a level control means. For this purpose there is provided a transversely disposed pin 80 extending through the two side walls 34 and having rotatably or oscillatably journalled thereon as by a sleeve 82 disposed between a pair of spacer sleeves 84 the hollow arm 86 of a conventional form of mercury control switch 88. The previously mentioned conduit means 22 extends through this hollow stem 86 and to the mecury switch elements in the unit 88. The arrangement is such that when a desired level has been reached in the chamber 74, the electric control system will cause the solenoid valve 20 to stop further flow of the water until the level in the control unit drops to a predetermined extent. Thus, wastage of water is to a large extent eliminated by this automatic control means and, as previously set forth, any desired number of the control units 14 may be utilized throughout the entire irrigation system.

In FIGURE 9 there is disclosed a slightly modified construction of the capillary slot means for feeding water from the passage 36 into a partition and through the capillary system of the same into one or more of the wells or chambers. In a preceding form of the invention, as shown in FIGURE 7, the slot 44 was fan shaped as indicated at 48. However, in FIGURE 9, the slot is merely a capillary conduit as indicated by the numeral 90 except that its upper end is laterally enlarged as at 92 in order to afford communication with the series of channels 56 disposed in the oppositely inclined top surfaces 52 and 54 of the various partitions and the divider wall 72 as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sub-surface irrigation system comprising a source of water, a sub-surface irrigation conduit connected to said source, a series of spaced sub-surface irrigation units each directly connected to said irrigation conduit, each irrigation unit comprising a container having water impervious bottom, side and end walls and an open top and having disposed within said container and carried thereby an upstanding web, a capillary slot opening at the top surface of said web and extending downwardly through said web and communicating with said irrigation conduit, transverse channels in the top of said web communicating with said slot.

2. The combination of claim 1 including means for controlling the supply of water from said source to said conduit, a level responsive control means in one of said units operatively connected to said water supply controlling means.

3. The combination of claim 1 wherein said units have each a passage extending longitudinally therethrough for connection to the passages of adjacent units, said capillary slot communicating with said passage.

4. The combination of claim 1 wherein said units have each a passage extending longitudinally therethrough for connection to the passages of adjacent units, said capillary passage system communicating with said longitudinal passage.

5. The combination of claim 1 wherein said webs are lower than the walls of said body whereby water may flow over said web between chambers.

6. The combination of claim 1 wherein the top surface of said web is inclined downwardly from said capillary passage system to opposite sides thereof.

7. The combination of claim 1 including a cover loosely embracing the top and upper sides of said web.

References Cited by the Examiner
UNITED STATES PATENTS

| | | | |
|---|---|---|---|
| 202,331 | 4/78 | Conway | 61—13 |
| 1,052,121 | 2/13 | Austin | 61—13 |
| 1,152,901 | 9/15 | Naylor | 61—13 |
| 1,222,648 | 4/17 | Marks. | |
| 1,343,871 | 6/20 | Lewis | 61—13 |
| 1,374,416 | 4/21 | Wilde | 61—13 |
| 2,223,360 | 12/40 | Ellis | 61—13 |
| 2,346,029 | 4/44 | Jennings | 61—13 |
| 2,653,449 | 9/53 | Stauch | 61—13 |
| 2,817,956 | 12/57 | Young | 61—13 |

JACOB L. NACKENOFF, *Primary Examiner.*

WILLIAM I. MUSHAKE, EARL J. WITMER,
*Examiners.*